(12) United States Patent
Hays et al.

(10) Patent No.: US 10,598,525 B2
(45) Date of Patent: Mar. 24, 2020

(54) SENSOR ASSEMBLY VALIDATION

(75) Inventors: Paul J Hays, Lafayette, CO (US); Craig B McAnally, Thornton, CO (US)

(73) Assignee: Micron Motion, Inc., Boulder, CO (US)

(*) Notice: Subject to any disclaimer, the term of this patent is extended or adjusted under 35 U.S.C. 154(b) by 613 days.

(21) Appl. No.: 13/814,563

(22) PCT Filed: Aug. 27, 2010

(86) PCT No.: PCT/US2010/046937
§ 371 (c)(1),
(2), (4) Date: Feb. 6, 2013

(87) PCT Pub. No.: WO2012/026943
PCT Pub. Date: Mar. 1, 2012

(65) Prior Publication Data
US 2013/0125612 A1    May 23, 2013

(51) Int. Cl.
*G01D 18/00* (2006.01)
*G01F 25/00* (2006.01)
*G01F 1/84* (2006.01)

(52) U.S. Cl.
CPC .......... *G01D 18/00* (2013.01); *G01F 1/8477* (2013.01); *G01F 25/0007* (2013.01)

(58) Field of Classification Search
CPC .... G01D 18/00; G01F 1/8477; G01F 25/0007
USPC ........................................................ 73/1.16
See application file for complete search history.

(56) References Cited

U.S. PATENT DOCUMENTS

| | | | | |
|---|---|---|---|---|
| 2,958,218 A | * | 11/1960 | Hill | G01F 25/003 377/21 |
| 5,207,088 A | * | 5/1993 | Geery | G01F 1/08 73/1.16 |
| 5,347,476 A | * | 9/1994 | McBean, Sr. | G01D 3/022 324/174 |
| 5,907,104 A | | 5/1999 | Cage et al. | |
| 5,983,700 A | * | 11/1999 | Yamaguchi et al. | 73/1.34 |
| 6,170,338 B1 | * | 1/2001 | Kleven | G01F 1/3254 73/861.22 |
| 6,292,810 B1 | * | 9/2001 | Richards | G06F 17/246 707/999.1 |
| 6,327,914 B1 | * | 12/2001 | Dutton | G01F 1/8413 73/32 A |
| 6,539,313 B1 | * | 3/2003 | Bornemann | B23Q 11/0085 408/10 |

(Continued)

FOREIGN PATENT DOCUMENTS

JP    2007521470    8/2007
JP    2009031153    12/2009
(Continued)

*Primary Examiner* — Marrit Eyassu
(74) *Attorney, Agent, or Firm* — The Ollila Law Group LLC (57) ABSTRACT

A method for validating a sensor assembly of a meter is provided. The method comprises a step of receiving one or more sensor calibration values. The method further comprises a step of comparing the received sensor calibration values to one or more known sensor calibration values. The method can then validate the sensor assembly if the one or more received sensor calibration values are within a predetermined tolerance of the one or more known sensor calibration values.

18 Claims, 4 Drawing Sheets

(56) References Cited

U.S. PATENT DOCUMENTS

| | | | |
|---|---|---|---|
| 7,505,861 B2 * | 3/2009 | Buhl | G01F 25/0007 |
| | | | 165/47 |
| 7,523,639 B2 | 4/2009 | Hays | |
| 2002/0133307 A1 * | 9/2002 | Maginnis | 702/100 |
| 2003/0233860 A1 * | 12/2003 | Deane | G01F 1/363 |
| | | | 73/1.16 |
| 2007/0028663 A1 * | 2/2007 | Patten et al. | 73/1.34 |
| 2007/0113678 A1 | 5/2007 | Baker et al. | |
| 2007/0193334 A1 * | 8/2007 | Hays | 73/1.34 |
| 2008/0027660 A1 * | 1/2008 | Keese et al. | 702/45 |
| 2009/0222231 A1 * | 9/2009 | Berger et al. | 702/104 |

FOREIGN PATENT DOCUMENTS

| | | |
|---|---|---|
| WO | 2005062003 A1 | 7/2005 |
| WO | 2009059975 A1 | 5/2009 |

* cited by examiner

SENSOR ASSEMBLY VALIDATION

TECHNICAL FIELD

The present invention relates to, meters, and more particularly, to a method and apparatus for validating a sensor assembly of a meter.

BACKGROUND OF THE INVENTION

Vibrating meters, such as for example, vibrating densitometers and Coriolis flow meters are generally known and are used to measure mass flow and other information for materials within a conduit. The meter comprises a sensor assembly and an electronics portion. The material within the sensor assembly may be flowing or stationary. Each type of sensor may have unique characteristics, which a meter must account for in order to achieve optimum performance. For example, some sensors may require a flow tube apparatus to vibrate at particular displacement levels. Other sensor assembly types may require special compensation algorithms.

The meter electronics typically include stored sensor calibration values for the particular sensor being used. The meter electronics uses these sensor calibration values in order to accurately measure mass flow rate and density. The sensor calibration values can comprise calibration values derived from measurements under test conditions, such as at the factory. Therefore, each sensor type can have unique calibration values.

Exemplary Coriolis flow meters are disclosed in U.S. Pat. Nos. 4,109,524, 4,491,025, and Re. 31,450 all to J. E. Smith et al. These flow meters have one or more conduits of straight or curved configuration. Each conduit configuration in a Coriolis mass flow meter has a set of natural vibration modes, which may be of simple bending, torsional, or coupled type. Each conduit can be driven to oscillate at a preferred mode.

Material flows into the flow meter sensor assembly from a connected pipeline on the inlet side of the sensor, is directed through the conduit(s), and exits the sensor through the outlet side of the sensor. The natural vibration modes of the vibrating, material filled system are defined in part by the combined mass of the conduits and the material flowing within the conduits.

When there is no flow through the sensor, a driving force applied to the conduit(s) causes all points along the conduit(s) to oscillate with identical phase or a small "zero offset", which is a time delay measured at zero flow. As material begins to flow through the sensor, Coriolis forces cause each point along the conduit(s) to have a different phase. For example, the phase at the inlet end of the sensor lags the phase at the centralized driver position, while the phase at the outlet leads the phase at the centralized driver position. Pick-off sensors on the conduit(s) produce sinusoidal signals representative of the motion of the conduit(s). Signals output from the pick-off sensors are processed to determine the phase difference between the pick-off sensors. The phase difference between the two or more pick-off sensors is proportional to the mass flow rate of material flowing through the conduit(s).

The mass flow rate of the material can be determined by multiplying the phase difference by a Flow Calibration Factor (FCF). Prior to installation of the sensor assembly of the flow meter into a pipeline, the FCF is determined by a calibration process. In the calibration process, a fluid is passed through the flow tube at a known flow rate and the relationship between the phase difference and the flow rate is calculated (i.e., the FCF). The sensor assembly of the flow meter subsequently determines a flow rate by multiplying the FCF by the phase difference of the pick-off sensors. In addition, other calibration factors can be taken into account in determining the flow rate.

Many vibrating meter applications comprise a vibrating sensor network that may include multiple sensors operating within a communication network of some manner. The network commonly includes a sensor monitoring system that gathers measured flow data and controls and coordinates operations of various sensors. The network may include vibrating sensors of different sizes, models, model years, and electronics and software versions. One problem faced by users of meters is the ability to correctly identify the particular sensor component being used with the meter electronics. Various prior art attempts exist such as manually entering the model/type of the sensor into the meter electronics, having the meter electronics obtain the sensor type data from the sensor in the form of a readable code or identifier stored in a memory included in the sensor, obtaining calibration data for the sensor to identify the type of sensor, etc. These prior art attempts are disclosed in U.S. Pat. No. 7,523,639, assigned on its face to Micro Motion, Inc., which is hereby incorporated by reference. However, while these prior art approaches can identify various types of sensors, manufacturers still face competition by "knock-off" sensor assemblies, i.e., unauthorized copies of sensor assemblies, that are used with the manufacturer's meter electronics. Customers may be confused and believe they are using a particular manufacturer's meter, when in fact, they are using only a portion of the manufacturer's meter. For example, a user may be utilizing a meter electronics manufactured and sold by Micro Motion, Inc. while the sensor assembly of the vibrating meter is manufactured by another company. As a result, the vibrating meter will not perform according to Micro Motion's standards. This not only reduces the sales by the manufacturer, but can also weaken the manufacturer's brand name recognition if the knock-off sensor does not meet the manufacturer's quality and accuracy standards.

Prior to the present invention, restricting a customer's use of particular meter electronics with a knock-off sensor was difficult if not impossible so long as the customer was able to input the correct calibration information for the sensor into the meter electronics. Even in prior art approaches where calibration values for the sensor were obtained, the approach did not restrict the use of the meter electronics. For example, the '639 patent mentioned above, discloses a flow meter type identification where calibration values for the sensor assembly of the flow meter are received and correlated to known sensor calibration values. Based on the correlation, the sensor type is identified. The problem with this approach is that the sensor type is simply selected by the calibration values that most closely match the stored values. Therefore, even if the calibration values received by the meter electronics do not match a stored value corresponding to a particular sensor type, the system simply assumes that the sensor comprises the sensor type with the closest calibration values and that the error is due to some anomaly in the manufacturing process or calibration process. Consequently, a knock-off sensor can be used even with the approach disclosed by the '639 patent.

The present invention solves this and other problems and an advance in the art is achieved. The present invention validates a sensor type by comparing one or more received calibration values to known calibration values. If the one or more received calibration values fall outside of a predetermined tolerance, the meter electronics rejects the sensor as comprising an invalid sensor type. For example, the sensor may comprise an invalid sensor type if it is manufactured by a different company.

SUMMARY OF THE INVENTION

A method for validating a sensor assembly of a meter is provided according to an embodiment of the invention. The method comprises a step of receiving one or more sensor calibration values. According to an embodiment of the invention, the method further comprises a step of comparing the received sensor calibration values to one or more known sensor calibration values. According to an embodiment of the invention, the method also comprises a step of validating the sensor assembly if the one or more received sensor calibration values are within a predetermined tolerance of the one or more known sensor calibration values.

A meter electronics for a meter is provided according to an embodiment of the invention. The meter includes a sensor assembly. According to an embodiment of the invention, the meter electronics includes a processing system configured to receive one or more sensor calibration values. The processing system is further configured to compare the received sensor calibration values to one or more known sensor calibration values. According to an embodiment of the invention, the processing system is further configured to validate the sensor assembly if the one or more received sensor calibration values are within a predetermined tolerance of a known sensor calibration value of the one or more known sensor calibration values.

ASPECTS

According to an aspect of the invention, a method for validating a sensor assembly of a meter comprises steps of:
  receiving one or more sensor calibration values;
  comparing the received sensor calibration values to one or more known sensor calibration values; and
  validating the sensor assembly if the one or more received sensor calibration values are within a predetermined tolerance of the one or more known sensor calibration values.

Preferably, the method further comprises a step of invalidating the sensor assembly if the one or more received sensor calibration values exceed the known sensor calibration values by more than the predetermined tolerance.

Preferably, the method further comprises a step of preventing a meter electronics of the meter in communication with the sensor assembly from operating with the sensor assembly if the sensor assembly is invalid.

Preferably, the method further comprises a step of identifying a sensor type of the sensor assembly based on the comparison of the received sensor calibration values and the known sensor calibration values.

Preferably, the method further comprises a step of storing the identified sensor type along with a sensor identifier.

Preferably, one of the one or more received sensor calibration values comprises a Flow Calibration Factor (FCF).

Preferably, one of the one or more received sensor calibration values comprises a quiescent harmonic frequency (K1) value.

Preferably, the sensor assembly comprises a sensor component of a Coriolis flow meter.

According to another aspect of the invention, a meter electronics for a meter including a sensor assembly includes a processing system is configured to:
  receive one or more sensor calibration values;
  compare the received sensor calibration values to one or more known sensor calibration values; and
  validate the sensor assembly if the one or more received sensor calibration values are within a predetermined tolerance of the one or more known sensor calibration values.

Preferably, the processing system is further configured to invalidate the sensor assembly if the one or more received sensor calibration values exceed the known sensor calibration values by more than the predetermined tolerance.

Preferably, the processing system is further configured to prevent the meter electronics from operating with the sensor assembly if the sensor assembly is invalid.

Preferably, the processing system is further configured to identify a sensor type of the sensor assembly based on the comparison of the received sensor calibration values and the known sensor calibration values.

Preferably, the processing system is further configured to store the identified sensor type along with a sensor identifier.

Preferably, one of the one or more received sensor calibration values comprises a Flow Calibration Factor (FCF).

Preferably, one of the one or more received sensor calibration values comprises a quiescent harmonic frequency (K1) value.

Preferably, the sensor assembly comprises a sensor component of a Coriolis flow meter.

DETAILED DESCRIPTION OF THE INVENTION

FIGS. 1-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
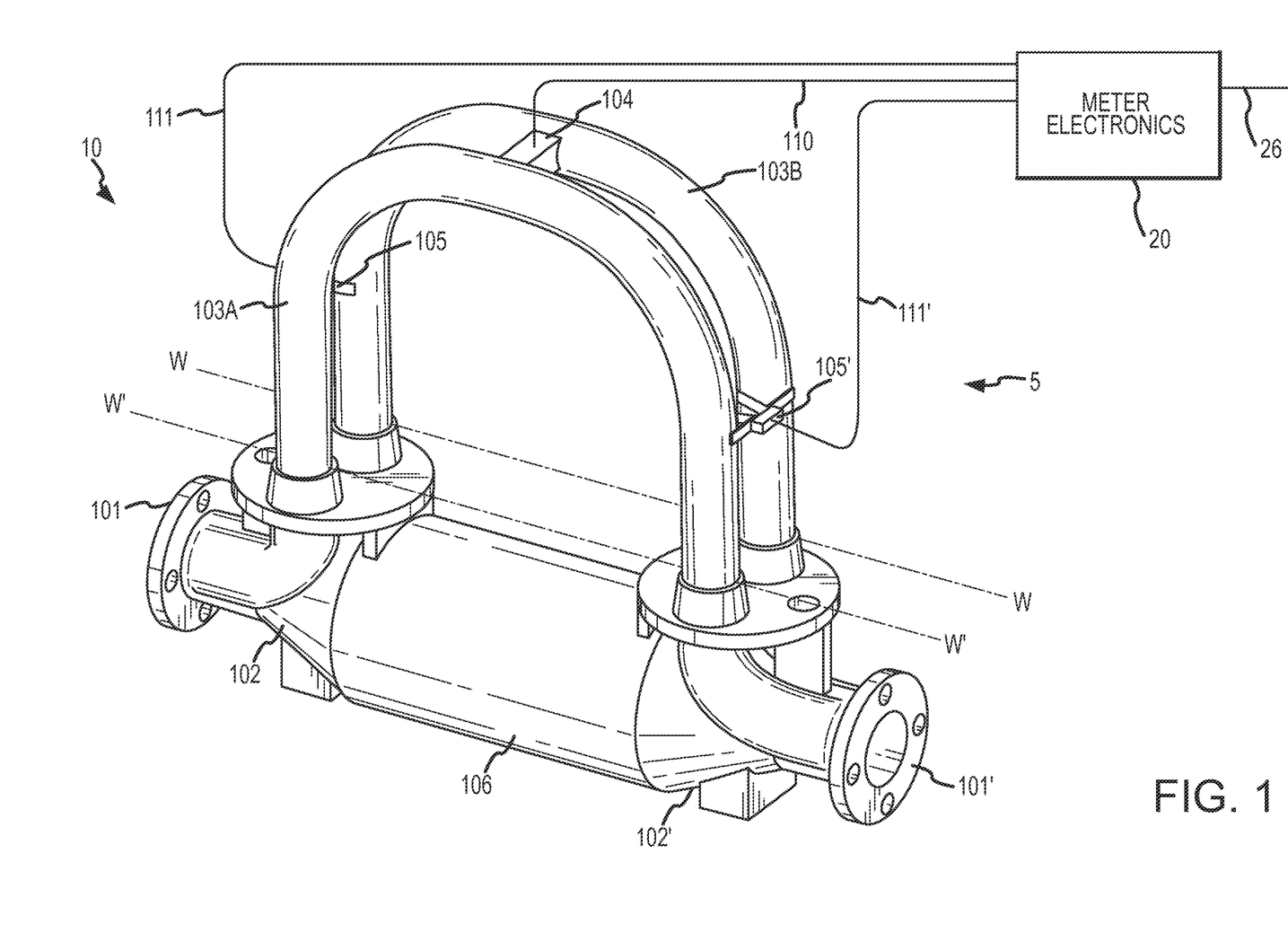
FIG. 1 shows a meter according to an embodiment of the invention.

FIG. 1 shows a vibrating meter 5 in the form of a Coriolis flow meter comprising a sensor assembly 10 and a meter electronics 20 according to an embodiment of the invention. The sensor assembly 10 receives a flowing fluid in the embodiment shown; however, sensor assemblies of meters are not necessarily limited to a structure where a fluid under test is flowing. Therefore, the sensor assembly may comprise the vibrating portion of a vibrating densitometer where the fluid is not flowing, the sensing portion of ultra-sonic flow meters, the sensing portion of magnetic volumetric meters, etc. Further, while the present invention is described in terms of flow meters as an example, the present invention is applicable to other applications where a meter comprises a sensor assembly and an electronics portion where calibration values are used in conjunction with the sensor assembly of the meter to increase the accuracy of measurements.

In the embodiment shown, the meter electronics 20 is connected to the sensor assembly 10 to measure one or more characteristics of a flowing material, such as, for example, density, mass flow rate, volume flow rate, totalized mass flow, temperature, and other information. While the meter electronics 20 is shown in communication with a single sensor 10, it should be appreciated that the meter electronics 20 may communicate with multiple meter assemblies, including one or more additional meter electronics (not shown). Further, it should be appreciated that while the vibrating meter 5 is described as comprising a Coriolis flow meter, the vibrating meter 5 could just as easily comprise another type of vibrating meter, such as a vibrating densitometer, a vibrating volumetric flow meter, or some other vibrating meter that lacks all of the measurement capabilities of Coriolis flow meters. Therefore, the present invention should not be limited to Coriolis flow meters. Rather, the meter electronics 20 may be in communication with other types of sensor assemblies, with a flowing fluid or a stationary fluid.

The sensor 10 includes a pair of flanges 101 and 101', manifolds 102 and 102', and conduits 103A and 103B. Manifolds 102, 102' are affixed to opposing ends of the conduits 103A and 103B. Flanges 101 and 101' of the Coriolis flow meter are affixed to opposite ends of the spacer 106. The spacer 106 maintains the spacing between manifolds 102, 102' to prevent undesired vibrations in the conduits 103A and 103B. The conduits 103A and 103B extend outwardly from the manifolds in an essentially parallel fashion. When the sensor 10 is inserted into a pipeline system (not shown) which carries the flowing material, the material enters sensor 10 through the flange 101, passes through the inlet manifold 102 where the total amount of material is directed to enter conduits 103A, 103B, flows through the conduits 103A, 103B and back into the outlet manifold 102' where it exits the sensor 10 through the flange 101'.

The sensor 10 can also include a driver 104. The driver 104 is shown affixed to the conduits 103A, 103B in a position where the driver 104 can vibrate the conduits 103A, 103B in the drive mode, for example. The driver 104 may comprise one of many well-known arrangements such as a coil mounted to the conduit 103A and an opposing magnet mounted to the conduit 103B. A drive signal in the form of an alternating current can be provided by the meter electronics 20, such as for example via pathway 110, and passed through the coil to cause both conduits 103A, 103B to oscillate about bending axes W-W and W'-W'.

The sensor 10 includes a pair of pick-off sensors 105, 105' that are affixed to the conduits 103A, 103B. According to an embodiment of the invention, the pick-offs 105, 105' may be electromagnetic detectors, for example, pick-off magnets and pick-off coils that produce pick-off signals that represent the velocity and position of the conduits 103A, 103B. For example, the pick-offs 105, 105' may supply pick-off signals to the meter electronics 20 via pathways 111, 111'. Those of ordinary skill in the art will appreciate that the motion of the conduits 103A, 103B is proportional to certain characteristics of the flowing material, for example, the mass flow rate and the density of the material flowing through the conduits 103A, 103B.

According to an embodiment of the invention, the meter electronics 20 receives the pick-off signals from the pick-offs 105, 105'. Path 26 can provide an input and an output means that allows one or more meter electronics 20 to interface with an operator. The meter electronics 20 can measure one or more characteristics of the fluid under test such as, for example, a phase difference, a frequency, a time delay, a density, a mass flow rate, a volume flow rate, a totalized mass flow, a temperature, a meter verification, and other information.

Figure 2:
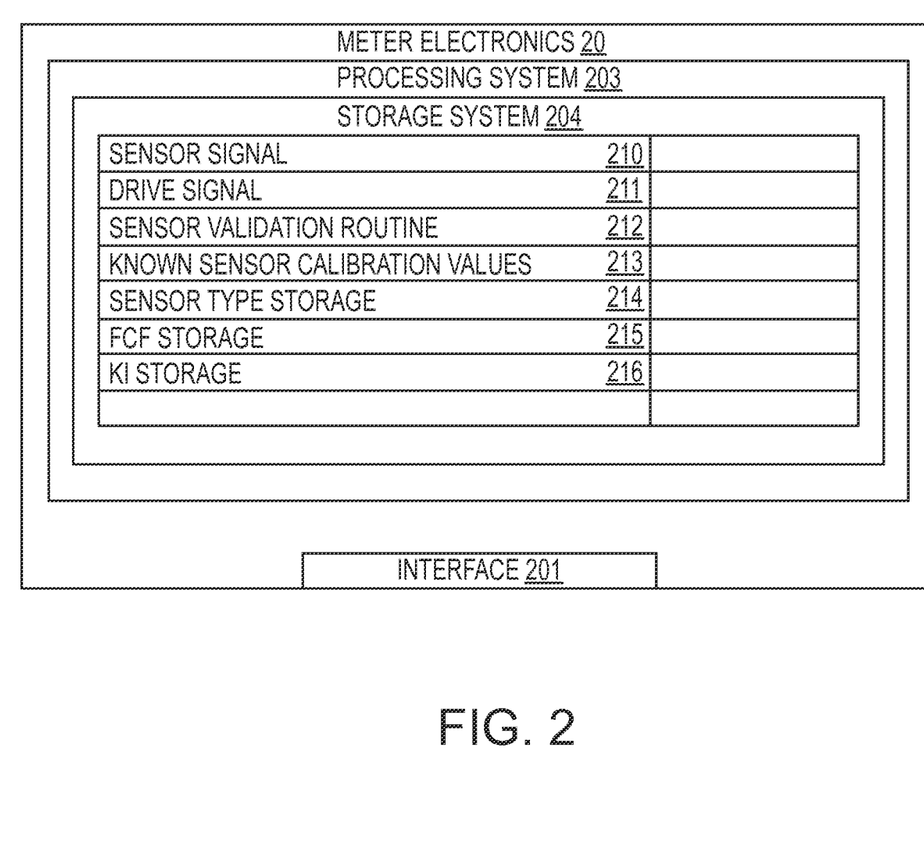
FIG. 2 shows a meter electronics according to an embodiment of the invention.

FIG. 2 shows the meter electronics 20 outlined in FIG. 1 according to an embodiment of the invention. The meter electronics 20 can include an interface 201 and a processing system 203. The processing system 203 may include a storage system 204. The storage system 204 may comprise an internal memory as shown, or alternatively, may comprise an external memory. The meter electronics 20 can generate a drive signal 211 and supply the drive signal 211 to the driver 104 shown in FIG. 1. The meter electronics 20 can also receive sensor signals 210 from the sensor 10, such as from pick-off sensors 105, 105' via leads 111 and 111' shown in FIG. 1. In some embodiments, the sensor signals 210 may be received from the driver 104. The meter electronics 20 can operate as a densitometer or can operate as a flow meter, including operating as a Coriolis mass flow meter. It should be appreciated that the meter electronics 20 may also operate as some other type of vibrating meter assembly and the particular examples provided should not limit the scope of the present invention. The meter electronics 20 can process the sensor signals 210 in order to obtain one or more flow characteristics of the material flowing through the conduits 103A, 103B.

The interface 201 can receive the sensor signals 210 from the driver 104 or the pick-off sensors 205, 205', via leads 210, 211, 211'. The interface 201 may perform any necessary or desired signal conditioning, such as any manner of formatting, amplification, buffering, etc. Alternatively, some or all of the signal conditioning can be performed in the processing system 203. In addition, the interface 201 can enable communications between the meter electronics 20 and external devices. The interface 201 can be capable of any manner of electronic, optical, or wireless communication.

The interface 201 in one embodiment can include a digitizer (not shown), wherein the sensor signals 210 comprise analog sensor signals. The digitizer can sample and digitize the analog sensor signals and produce digital sensor signals. The digitizer can also perform any needed decimation, wherein the digital sensor signal is decimated in order to reduce the amount of signal processing needed and to reduce the processing time.

The processing system 203 can conduct operations of the meter electronics 20 and process flow measurements from the sensor 10. The processing system 203 can execute the data processing required to implement one or more processing routines, such as a sensor validation routine 212, as well as process the flow measurements in order to produce one or more flow characteristics.

The processing system 203 can comprise a general-purpose computer, a micro-processing system, a logic circuit, or some other general purpose or customized processing device. The processing system 203 can be distributed among multiple processing devices. The processing system 203 can include any manner of integral or independent electronic storage medium, such as the storage system 204.

It should be understood that the meter electronics 20 may include various other components and functions that are generally known in the art. These additional features are omitted from the description and the figures for the purpose of brevity. Therefore, the present invention should not be limited to the specific embodiments shown and discussed.

As discussed above, according to an embodiment of the invention, the meter electronics 20 can implement a sensor validation routine 212 in order to validate a sensor assembly. The sensor validation routine 212 can validate a sensor type of one or more sensors in communication with the meter electronics 20. While FIG. 1 shows only a single sensor 10 in communication with the meter electronics 20, those skilled in the art will readily appreciate that multiple sensors may be in communication with the meter electronics 20. Further, the meter electronics 20 can be capable of operating a variety of different sensor types. Therefore, it is important to confirm that the particular sensors in communication with the meter electronics 20 comprise valid sensors.

Each sensor, such as the sensor 10 in communication with the meter electronics 20 has various calibration values. For example, if the sensor 10 comprises a Coriolis flow meter, the calibration values may comprise a FCF and a quiescent harmonic frequency (K1) value. The FCF represents the flow tube geometry of the specific sensor apparatus. The FCF can account for variations in the flow tube dimensions during manufacturing and can also account for variations in vibrational response due to variations in properties of the flow tube material. The K1 value represents a quiescent harmonic frequency of the sensor as measured with air in the flow tube(s) and at a calibration temperature of 0° Centigrade. The K1 value typically is in units of frequency or in units of time (i.e., a wave period). Other sensor calibration values (not shown) can comprise, but are not limited to, a K value (same as K1 but for water in the sensor), a K3 value for flow effect of density, a temperature calibration value, etc. Other sensor calibration values are contemplated and are included within the scope of the present invention.

As shown in FIG. 2, the storage system 204 of the meter electronics 20 can store various FCF values 215, various K1 values 216, which may be received during the sensor validation routine 212, for example, as well as other known sensor calibration values 213. The known sensor calibration values 213 can comprise a data structure that stores known values used for validating a sensor type (discussed below). For example, the known sensor calibration values 213 can comprise a data table. However, it should be understood that other data structures could be used to store and correlate sensor calibration values, such as look-up tables, etc. The meter electronics 20 can store the determined sensor type in the sensor type storage 214, which can be correlated to one or more calibration values as explained in more detail below.

In one embodiment, the known sensor calibration values 213 are stored in a correlation table 213. The correlation table 213 can include multiple sensor type records. A sensor type record of the correlation table 213 includes a set of known sensor calibration values and a corresponding sensor type for the set of known sensor calibration values. Therefore, for an input of a particular set of sensor calibration values, the correlation table 213 outputs a unique sensor type matching the particular set of sensor calibration values, to within a predetermined tolerance. If the input sensor calibration values fall outside of a predetermined tolerance of any of the stored sensor calibration values, the meter electronics 20 determines that the input values correspond to an invalid sensor and, in some embodiments, does not permit operation of the meter electronics 20 with the invalid sensor.

Figure 3:
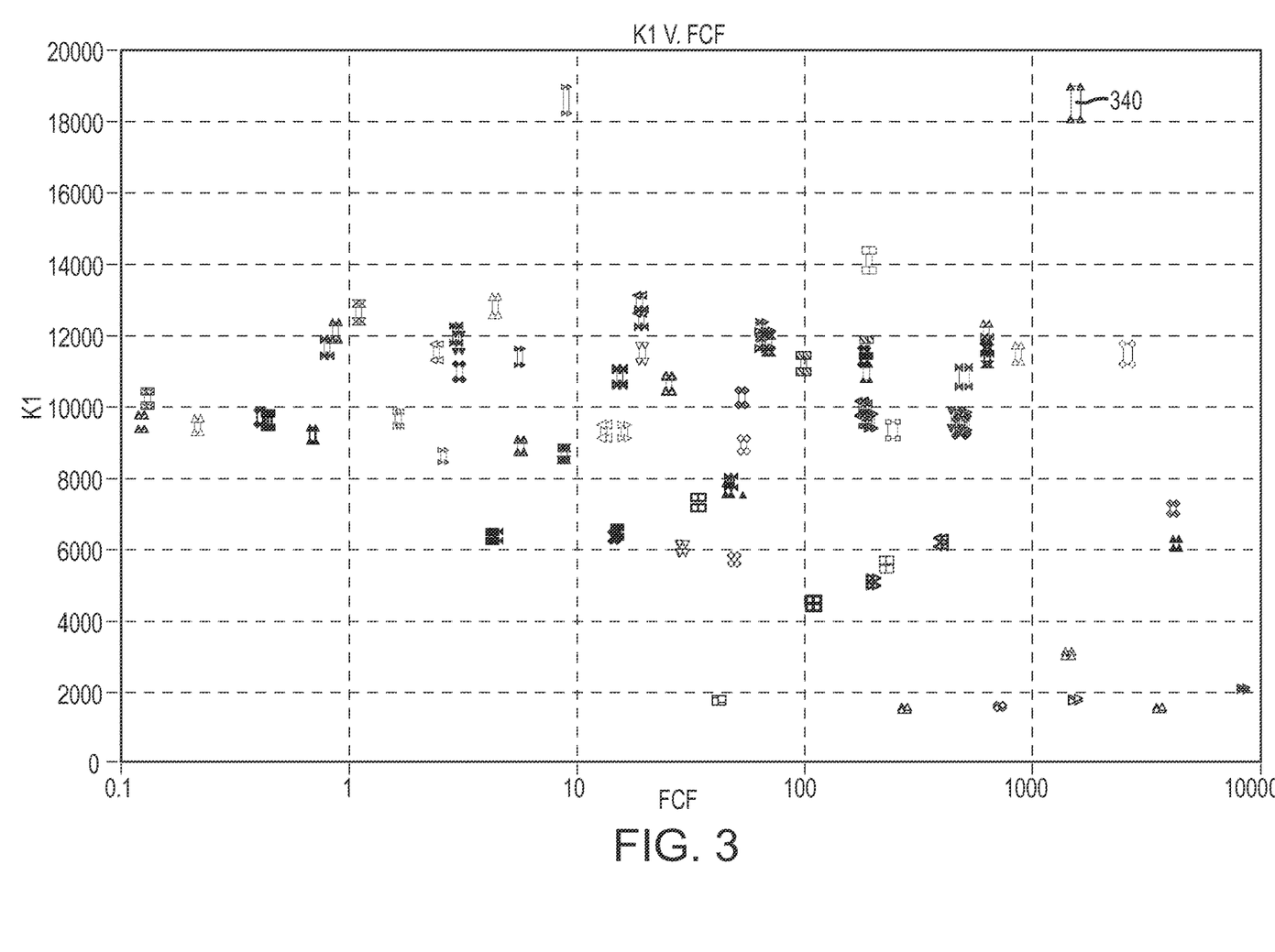
FIG. 3 is a chart that shows the relationship between some sensor types and the FCF and K1 values.

FIG. 3 is a chart that shows the relationship between some sensor types and the FCF and K1 values. It should be appreciated that not all sensor types are shown in the chart. It can be seen from the chart that the FCF and K1 values for each represented sensor type are tightly clustered. Therefore, by comparing a subject sensor's calibration values to these known parameters and clusters, the sensor type of the subject sensor can be validated. Conversely, if the input value exceeds a predetermined tolerance of the closest matching values, then the meter electronics 20 can reject the sensor as invalid. For example, one of the few points visible due to the small tolerances is in the upper right hand corner, labeled 340. The actual FCF for the particular sensor is 1552.9 while the K1 value is 18564. According to an embodiment of the invention, various points are shown surrounding the actual FCF and K1 values. These points define the predetermined tolerances. For example, the predetermined tolerance for the FCF value may comprise +/−0.05% while the predetermined tolerance for the K1 value may comprise +/−0.75%. These values are merely examples and should in no way limit the scope of the present invention. Therefore, if the sensor calibration values received by the meter electronics 20 are within the tolerance defined by the points surrounding the actual FCF and K1 values, the sensor comprises a valid sensor. Conversely, according to an embodiment of the invention, if the calibration values received by the meter electronics 20 exceed the tolerances in either the positive or the negative directions for either sensor calibration value, the meter electronics 20 can reject the sensor as invalid. The known sensor calibration values 213 available, thus determines the validity of a particular sensor being validated. According to an embodiment of the invention, if the meter electronics 20 determines the sensor is invalid, the meter electronics 20 may be prevented from operating with the sensor 10. For example, the processing system 203 may prevent the meter electronics 20 from sending a drive signal 211 to the driver 104 and/or processing received sensor signals 210 if the sensor is deemed invalid.

The sensor type is dictated by factors including, but not limited to, the manufacturer, the accuracy rating of the sensor, the pressure rating, the temperature rating, the material or materials used in forming the sensor, and the line size of the tubing forming the sensor. Each of these sensor characteristics can affect or control the sensor calibration values used in the determination of the sensor type. For example, a single manufacturer may be able to reproduce thousands of sensors of a specific sensor type with each of the individual sensors having a FCF to within 0.05% of one another and a K1 value to within 0.75% of one another. Conversely, other manufacturers that attempt to reproduce the sensor type may have FCF and K1 values well outside these tolerances. It should be appreciated, that the above-mentioned values are merely examples and the values may exceed these tolerances for other manufacturers as well as other sensor types made by the same manufacturer.

According to an embodiment of the invention, the meter electronics can utilize the reproduction capabilities of a particular manufacturer in order to exclude sensors as invalid with calibration values that exceed a predetermined tolerance from stored calibration values, and presumably are made from a different manufacturer. If a sensor has calibration values that exceed the tolerance of the stored calibration values, but the user or operator simply inputs different values in order to fall within the predetermined tolerance and thus validate the sensor, the meter electronics 20 may accept the sensor as an acceptable sensor type, but any measurements generated will be inaccurate because the wrong calibration values are being used to measure the one or more fluid characteristics.

According to an embodiment of the invention, the meter electronics 20 can remotely read the calibration values, such as obtaining the sensor calibration values from additional sensors (not shown) via communication line 26, for example. Alternatively, the sensor calibration values can be entered into the meter electronics 20 by a user through the user interface 201. As another alternative, the sensor calibration values may be obtained from additional sensors wirelessly through the interface 201 or through other remote devices through the communication interface 201. According to another embodiment of the invention, the sensor may include a memory device (not shown) that can store the sensor calibration values. The meter electronics 20 may then receive the sensor calibration values once the meter electronics 20 is in communication with the sensor and thus, the memory device, such as disclosed in the above-mentioned '639 patent.

The sensor calibration values are used in operation by the meter electronics to calibrate one or more fluid characteristics. The sensor calibration values are typically obtained by measurement at the factory, under test conditions. The sensor calibration values are commonly stored in the meter electronics before the sensor is shipped from the factory. However, the sensor calibration values can be programmed or re-programmed into the meter electronics by a user in the field. Advantageously, if the meter electronics 20 is reconfigured, the values can be re-programmed so that the particular sensor assembly can still be confirmed as a valid sensor type. This programming is typically facilitated by a tag attached to the sensor, with the tag being stamped, embossed, or printed with the factory-measured sensor calibration values. Therefore, the user can re-program the meter electronics with correct calibration information if required, such as in the event of power loss, memory loss, re-configuration, replacement of the sensor, etc.

Figure 4:
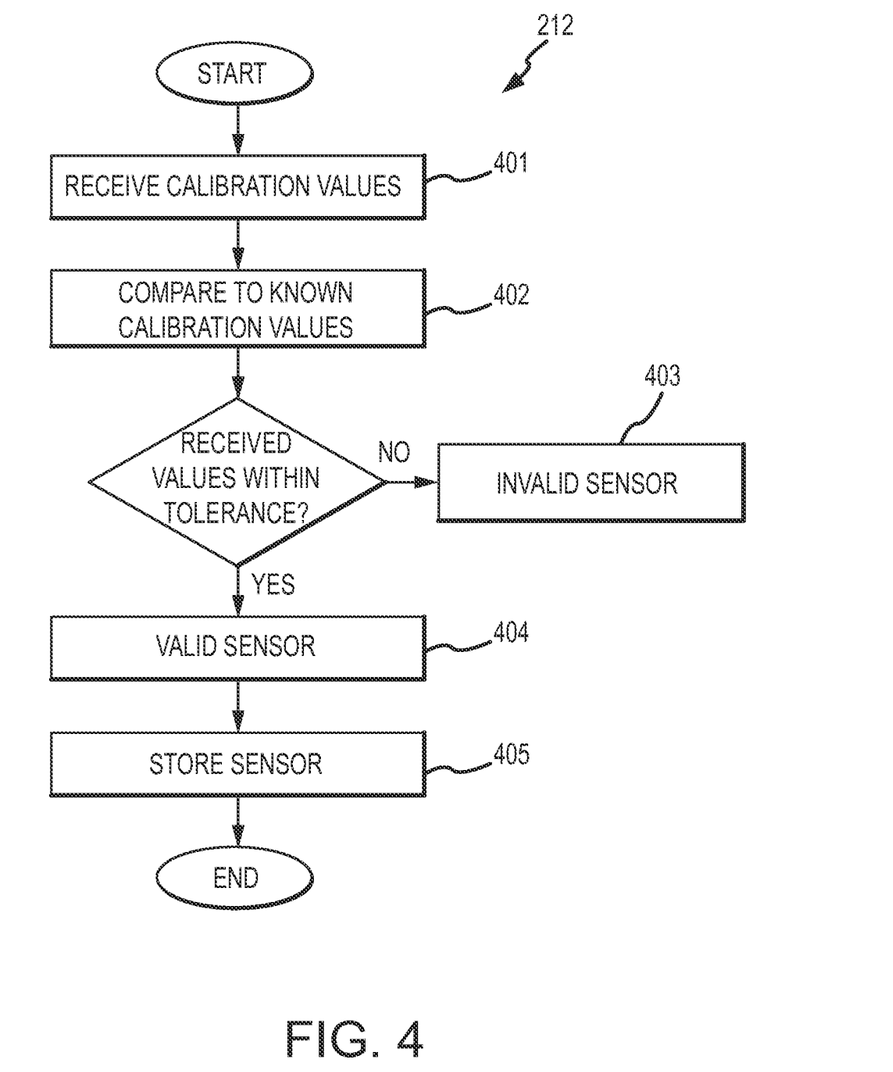
FIG. 4 is a flowchart of a sensor validation routine according to an embodiment of the invention.

FIG. 4 shows a sensor validation routine 212 according to an embodiment of the invention. The sensor validation routine 212 may be performed by the meter electronics 20, for example. The processing system 203 may be configured to perform the necessary signal and data processing to perform the sensor validation routine 212, for example. The sensor validation routine 212 may be embodied in a software product executed by the meter electronics 20.

The sensor validation routine 212 starts in step 401 where one or more sensor calibration values can be received by the meter electronics 20 for a sensor assembly to be validated, such as the sensor 10. The sensor calibration values may be determined from a calibration routine, for example, which are generally known in the art. As previously discussed, the sensor calibration values can comprise the FCF and the K1 values. The sensor calibration values can be concurrently or previously received from a user through a user interface, or can be concurrently or previously received from a remote terminal, for example. While the chart shown in FIG. 3 comprises two sensor calibration values, it should be appreciated that in some embodiments, the sensor may be validated using only a single sensor calibration value. Alternatively, more than two sensor calibration values may be used.

In step 402, the received sensor calibration values are compared to known sensor calibration values 213 that are substantially representative of various sensor types that are accepted as comprising valid sensor types. The known sensor calibration values may be retrieved from a graph, look-up table, etc. If the received sensor calibration values exceed the closest known sensor calibration value by more than the predetermined tolerance, the process proceeds to step 403 where the sensor to be validated fails the validation. Conversely, if the received sensor calibration values are within the predetermined tolerance, the process proceeds to step 404 where the sensor to be validated passes the validation and the meter electronics 20 can operate with the sensor.

The process may further include an optional step 405 where the validated sensor type is stored. The sensor type may be stored in a data structure of some manner, along with a sensor identifier of the subject sensor 10. The sensor identifier can be any manner of network address, sensor number, sensor serial number, assigned sensor number, etc., that is used to identify the subject sensor 10.

The sensor validation system and method according to the present invention differs from the prior art in that the sensor calibration values are used not only to identify the sensor type, but to validate the sensor type as an acceptable sensor to be used with the meter electronics. Prior art approaches did not restrict use of the meter electronics to only valid sensor. Rather, the meter electronics simply sought a "best fit" for the sensor in communication with the meter electronics. The prior art did not prevent knock-off sensor assembly from being used with the meter electronics 20.

The sensor validation according to the present invention can be implemented according to any of the embodiments in order to obtain several advantages, if desired. The sensor validation provides a low cost sensor validation. No extra hardware is needed in a sensor and the invention can be implemented through additional software routines. The sensor validation provides accurate and reliable sensor validation, without the introduction of additional reliability issues. According to an embodiment of the invention, the sensor validation provides a sensor validation that does not require any additional actions or operations on the part of a user or system operator. The sensor validation provides a sensor validation that uses information inherent within a sensor or a network of sensors.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other meters, and not just to the embodiments described above and shown in the accompanying figures. Accordingly, the scope of the invention should be determined from the following claims.

We claim:

1. A method for checking a sensor assembly of a meter by determining whether the sensor assembly is one of at least one valid sensor type, the method comprising steps of:

receiving with a meter electronics one or more sensor calibration values for the sensor assembly in communication with the meter electronics, wherein the received calibration values are correct calibration values for the sensor assembly;
comparing the received sensor calibration values to one or more known sensor calibration values, each known sensor calibration value corresponding to one of the at least one valid sensor type;
either (A) determining that the one or more received sensor calibration values are within a predetermined tolerance of the one or more known sensor calibration values corresponding to one of the at least one valid sensor type, and subsequently validating the sensor assembly; or
(B) determining that the one or more received sensor calibration values are not within a predetermined tolerance of the one or more known sensor calibration values corresponding to one of the at least one valid sensor type, and subsequently preventing the meter electronics of the meter in communication with the sensor assembly from operating with the sensor assembly as the sensor assembly is invalid.

2. The method of claim 1, further comprising a step of invalidating the sensor assembly if the one or more received sensor calibration values exceed the known sensor calibration values by more than the predetermined tolerance.

3. The method of claim 1, further comprising a step of identifying a sensor type of the sensor assembly based on the comparison of the received sensor calibration values and the known sensor calibration values.

4. The method of claim 3, further comprising a step of storing the identified sensor type along with a sensor identifier.

5. The method of claim 1, wherein one of the one or more received sensor calibration values comprises a Flow Calibration Factor (FCF).

6. The method of claim 1, wherein one of the one or more received sensor calibration values comprises a quiescent harmonic frequency (K1) value.

7. The method of claim 1, wherein the sensor assembly comprises a sensor component of a Coriolis flow meter.

8. A meter electronics (20) for a meter (5) including a sensor assembly (10), the meter electronics (20) including a processing system (203) configured to:
receive one or more sensor calibration values (215, 216) for the sensor assembly (10) in communication with the meter electronics (20), wherein the received calibration values are correct calibration values for the sensor assembly;
compare the received sensor calibration values (215, 216) to one or more known sensor calibration values (213), each known sensor calibration value corresponding to one of at least one valid sensor type;
validate that the sensor assembly (10) is one of the at least one valid sensor type by determining if the one or more received sensor calibration values (215, 216) are within a predetermined tolerance of the one or more known sensor calibration values (213) corresponding to the at least one valid sensor type; and
not permit the meter electronics (20) to operate with the sensor assembly (10) if the sensor assembly (10) is invalid.

9. The meter electronics (20) of claim 8, wherein the processing system (203) is further configured to invalidate the sensor assembly (10) if the one or more received sensor calibration values (215, 216) exceed the known sensor calibration values (213) by more than the predetermined tolerance.

10. The meter electronics (20) of claim 8, wherein the processing system (203) is further configured to identify a sensor type of the sensor assembly (10) based on the comparison of the received sensor calibration values (215, 216) and the known sensor calibration values (213).

11. The meter electronics (20) of claim 10, wherein the processing system (203) is further configured to store the identified sensor type (214) along with a sensor identifier.

12. The meter electronics (20) of claim 8, wherein one of the one or more received sensor calibration values comprises a Flow Calibration Factor (FCF).

13. The meter electronics (20) of claim 8, wherein one of the one or more received sensor calibration values comprises a quiescent harmonic frequency (K1) value.

14. The meter electronics (20) of claim 8, wherein the sensor assembly comprises a sensor component of a Coriolis flow meter.

15. A method for checking a sensor assembly of a meter, comprising steps of:
receiving with a meter electronics one or more sensor calibration values for the sensor assembly in communication with the meter electronics, wherein the received calibration values are correct calibration values for the sensor assembly;
retrieving one or more known sensor calibration values;
comparing the received sensor calibration values to the one or more known sensor calibration values wherein each known sensor calibration value corresponding to one of at least one valid sensor type; and
determining that the one or more received sensor calibration values fall outside a predetermine tolerance of the one or more known sensor calibration values and, subsequent to the determining, preventing an operation of the meter.

16. The meter electronics (20) of claim 15, wherein one of the one or more received sensor calibration values comprises a Flow Calibration Factor (FCF).

17. The meter electronics (20) of claim 15, wherein one of the one or more received sensor calibration values comprises a quiescent harmonic frequency (K1) value.

18. The meter electronics (20) of claim 15, wherein the sensor assembly comprises a sensor component of a Coriolis flow meter.

* * * * *

UNITED STATES PATENT AND TRADEMARK OFFICE
CERTIFICATE OF CORRECTION

PATENT NO. : 10,598,525 B2  
APPLICATION NO. : 13/814563  
DATED : March 24, 2020  
INVENTOR(S) : Paul J Hays and Craig B McAnally

Page 1 of 1

It is certified that error appears in the above-identified patent and that said Letters Patent is hereby corrected as shown below:

On the Title Page

Item [73], replace "Micron Motion, Inc." with --Micro Motion, Inc.--

Signed and Sealed this
Second Day of June, 2020

Andrei Iancu
*Director of the United States Patent and Trademark Office*